Sept. 13, 1955

R. STEINER 2,717,941

WEATHERSEAL FOR A MECHANISM ACTUATED
FROM THE EXTERIOR OF ITS HOUSING

Filed Dec. 17, 1951

INVENTOR.
RUDOLF STEINER
BY
W. R. Maltby
Roderick B. Jones
ATTORNEYS

United States Patent Office 2,717,941
Patented Sept. 13, 1955

2,717,941

WEATHERSEAL FOR A MECHANISM ACTUATED FROM THE EXTERIOR OF ITS HOUSING

Rudolf Steiner, Trenton, N. J.

Application December 17, 1951, Serial No. 262,143

2 Claims. (Cl. 200—168)

(Granted under Title 35, U. S. Code (1952), sec. 266)

The invention described herein may be manufactured and used by or for the Government of the United States of America for governmental purposes without the payment of any royalties thereon or therefor.

This invention pertains to the art of mechanisms, and particularly to a mechanism that is enclosed in a protective housing and is operated from the exterior thereof.

Atmospheric conditions may exist that injure certain mechanisms, or impair their operation. For example accumulation of foreign matter, such as ice, may clog a mechanism or cause it to deteriorate. When the mechanism is housed and is operated by an actuator that extends to the exterior of the housing, accumulation of ice or other foreign matter may interfere nevertheless with operation of the mechanism. The foreign matter may accumulate on the actuator and particularly between the actuator and the housing at the position where the actuator penetrates through the housing to extend from the interior to the exterior thereof.

As a specific example, an aircraft may travel in an atmosphere that is cold and stormy, and the formation of ice on the exterior surface of an aircraft is a well-known source of potential mishap and danger. Ice may form around an actuating member that is operated from a position exteriorly of an aircraft to operate a mechanism interiorly thereof.

The present invention is embodied in a housing for a mechanism that is operated by an actuator which extends to a position exteriorly of the housing. The invention comprises a conduit around the actuator and through which the actuator extends. The conduit is flexible and moves with the actuator, movement of the conduit operating to crush any accumulation of ice or other foreign matter, and operating to throw the ice off of and away from the conduit wall, as also out of position of interference with movement of the actuator.

The walls of the conduit are corrugated, the corrugations extending transversely of the conduit and in the direction of movement of the actuating arm. Under movement of the conduit with the actuator, the conduit flexes between convolutions of the corrugations. Spaces between corrugations are small and masses of accumulated ice between corrugations are reduced accordingly. Ice masses thus are prevented from growing to an extent to oppose effectively the force applied to actuate the actuating arm. In addition, the volumetric magnitudes of the spaces between corrugations change with movement of the actuator by flexure of the conduit, and this action causes the diminutive ice masses between corrugations to be crushed and thrown off of and away from the conduit walls and the actuator.

For a more detailed understanding of the principles of the invention, and for a disclosure of one practical embodiment thereof, attention is directed to the accompanying drawings, in which.

The invention is embodied in a housing 11, that encloses and protects a mechanism illustrated generally at 12. The particular structure of mechanism 12 is unimportant for understanding the present invention. In the practical embodiment of the disclosure, the mechanism 12 is an electrical switch, embodying a push button 15 which is depressed and raised to operate the switch mechanism 12.

Figure 1:
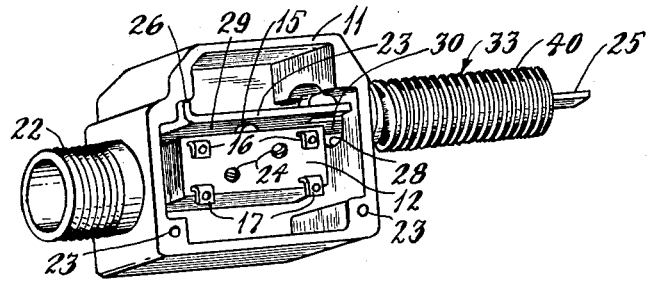
Fig. 1 is a perspective of a practical device embodying the invention, with parts removed for clearness of illustration.
Figure 2:
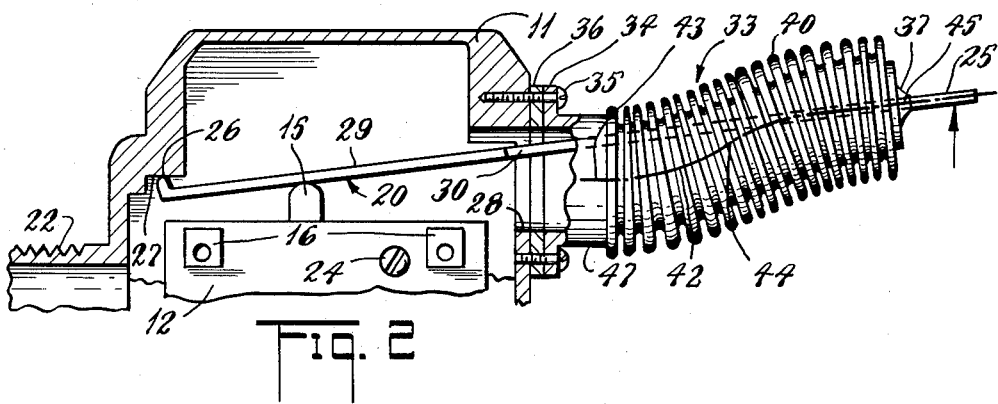
Fig. 2 is a side elevation, partly in section, illustrating the device of Fig. 1 in one position of its operation.
Figure 3:
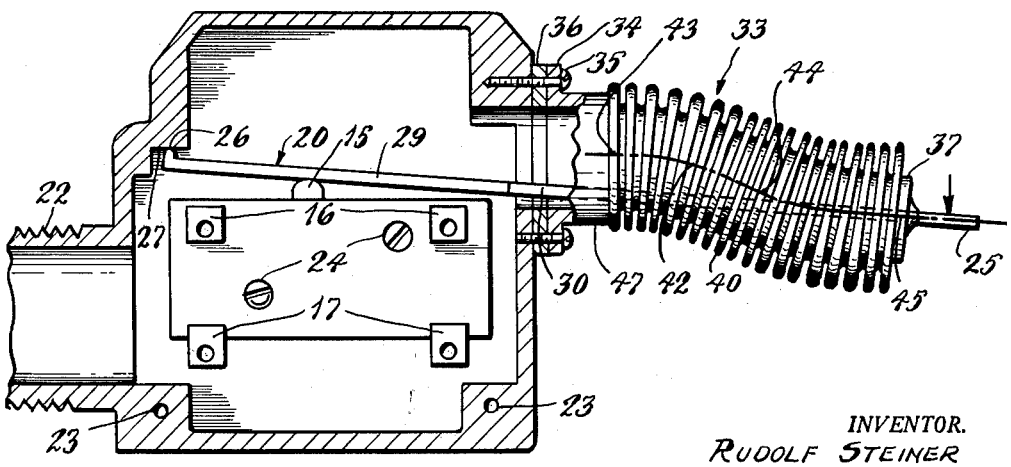
Fig. 3 is a side elevation similar to Fig. 2 illustrating the device of Fig. 1 in another position of operation.

The switch 12 of the disclosed practical embodiment has an "on" position of circuit through terminals 16, this circuit being closed when the push button 15 is raised as seen in Fig. 2, and a second "on" position of circuit that is closed through terminals 17 when the push button 15 is depressed as seen in Fig. 3. The switch 12 is in intermediate "off" position of Fig. 1, in which position both circuits are open through the respective sets of terminals 16 and 17.

Push button 15 is operated by the actuator 20, the push button being depressed to its position of Fig. 2 when the actuator is moved downwardly as seen in the drawing. When the actuator 20 is moved upwardly to its position in Fig. 2, the push button 15 follows the actuator to raised position, being actuated upwardly by any suitable mechanism within the switch 12 such as a spring.

Housing 11 encloses the switch 12 and protects it from ambient atmospheric conditions. A lid can be secured to the housing 11, by means of screws for example that fit the holes 23, to enclose completely the switch 12, the lid being removed from the illustrations of the drawing to show the interior of the housing 11 and the structure contained therein more clearly. Screws 24 secure switch 12 located in proper position within the housing 11.

The housing 11 comprises the nipple 22 for the passage of electrical leads into the housing, and the leads are connected to the terminals 16 and 17 in a manner that is well-known to persons skilled in the art. The nipple 22 is adapted to attach the housing 11 to a conduit containing the electrical leads, and this also is well-known in the art.

The actuator 20 is an elongated rigid member, constituting a beam or arm that extends from position of engagement with the push button 15 within the housing 11 to the exterior of the housing where the free end 25 of the actuator is positioned to be actuated upwardly or downwardly in the drawing to the respective positions of Figs. 2 and 3, operation of the actuator 20 being either manually or by any suitable mechanical means. In the specific embodiment of the disclosure, the actuator 20 constitutes a lever.

The actuator 20 operates the push button 15 by means of a mechanical movement within the housing 11, the mechanical movement in the disclosed embodiment comprising a lever.

The actuator 20 is bent along its end edge 26 that is remote from the free end 25, the edge 26 extending laterally of the length of lever 20 and comprising a fulcrum with the shoulder 27 interiorly of the housing 11 against which the edge 26 bears. The actuator 20 extends from the fulcrum at 27 which is along the wall at one side of the housing 11 across the interior space of the housing to and through the aperture 28 in the opposite wall. The push button 15 engages the actuator 20 along its length at a point between the shoulder 27 and the aperture 28. By the fulcrum edge 26 of the actuator 20 being offset laterally, the lever arm of 20 is positioned away from shoulder 27, and therefore does not engage the shoulder 27 when the lever swings.

A portion 29 of the length of actuator 20 that spans the space in housing 11 between the shoulder 27 and aperture 28 is wide enough to be confined by the housing 11 and its lid, and the actuator 20 is therefore held in proper operating position within the housing. The portion 30 of the length of arm 20 that extends beyond the wide portion 29 is narrow enough to fit inside the aperture 28 with clearance all around.

The conduit 33 encloses the actuator 20, and particularly the length 30 thereof that extends through the wall of housing 11 that includes the aperture 28. The conduit 33 comprises the attachment 34 at its one end, the attachment 34 constituting an end flange of the conduit that fits around the aperture 28 and is secured to the housing 11 by means of screws 35 to connect the end of the conduit to the housing 11 rigidly. Gasket 36 makes attachment 34 weatherproof. At its other end the conduit 33 comprises the attachment 37 which secures the corresponding end of the conduit to the actuator 20 by means of soldering or the like, the connection of attachment 37 also being rigid and weatherproof.

The walls of the conduit 33 are corrugated, the corrugations 40 extending transversely of the length of the conduit and of the actuator 20 contained therein, which thus disposes the corrugations in the direction of movement of the actuator. In the structure of the disclosed embodiment, the conduit 33 is a circular tube and the walls of the conduit 35 constitute a bellows of any suitable rigid material that is resilient, various metals being suitable for the purpose. It is preferred that the conduit 33 constitutes a weatherproof container for the actuator 20, particularly where it enters the housing 11.

Although the material of the conduit 33 is rigid, the conduit is flexible and moves with actuator 20. The conduit bends along convolutions between adjacent corrugations 40 of its wall, bending of the conduit being by and with movement of actuator 20 in respective opposite directions to the respective positions of Figs. 2 and 3. The corrugated walls of the conduit 33 are moved by its flexure to crush any ice or other foreign matter that adheres to the walls and tends to accumulate thereon. The foreign deposits are thereby thrown off of and away from the conduit 33 and the actuator 20 contained therein.

When the actuator 20 is moved to its upper position illustrated in Fig. 2, the axis 42 of the conduit 33 describes an upwardly directed reverse curve. When the actuator 20 is moved to its lower position illustrated in Fig. 3, the reverse curve of the axis 42 is directed downwardly. In the upper position of actuator 20 seen in Fig. 2, push button 15 is raised and circuit is closed through the set of terminals 16. Circuit is closed through the set of terminals 17 when the push button 15 is depressed by the actuator being in its lower position of Fig. 3. When no pressure is applied to the outer end 25 of the actuator 20 in either the upward direction of Fig. 2, or the downward direction of Fig. 3, the actuator 20 moves to its intermediate position of Fig. 1, in which the axis 42 of the conduit 33 is straight and coaxial with the tube of conduit 33 and with the aperture 28, the conduit being moved to its intermediate position of Fig. 1 by the inherent resiliency of the conduit. In the intermediate position of actuator 20 seen in Fig. 1, the push button 15 occupies its intermediate "off" position in which both circuits of respective terminals 16 and 17 are open.

Towards the right in Fig. 2 of the point 43, which is the nearest point along corrugations 40 to the rigid attachment 34, the axis 42 curves upwardly to the point 44, which is about halfway along the length of corrugations 40, and beyond the point 44 to the right in Fig. 2, the axis 44 curves downwardly to the point at 45, which is the nearest point along corrugations 40 to the attachment 37. At the point 45 and beyond it to the right in Fig. 2, the axis 42 of conduit 33 is disposed in the direction lengthwise of the actuator 20, being held so positioned by the rigidity of attachment 37. At the point 43 and to the left thereof, the axis of conduit 33 is disposed coaxially with the axis of aperture 28, being held so positioned by the rigidity of attachment 34, and the axis of aperture 28 coincides at least approximately with the straight-line axis 42 of conduit 33 in its relaxed intermediate position of Fig. 1. The reverse curvature of axis 42 that occurs when the conduit 33 is displaced by the actuator 20 being moved to either position of Fig. 2 or Fig. 3 is the result of the rigidity of attachments 34 and 35.

When the actuator 20 is moved downwards to its lower position of Fig. 3, to depress the push button 15, the axis 42 of the conduit 33 describes a downwardly directed reverse curve. From the point 43 to the point 44, the axis 42 curves downwardly from its direction at the point 43 and to the left thereof in Fig. 3. Between the point 44 and the point 45, the axis 42 of the conduit 33 curves upwardly, and at point 45 and to the right thereof in Fig. 3 the axis 42 is disposed in the direction of the length of actuator 20.

Convolutions of corrugations 40 of the conduit 33 are squeezed together or spread apart with each movement of actuator 20 to or from one of the positions of Figs. 2 and 3. Furthermore, there are areas comprising each less than the full length of corrugations 40 in which the convolutions are squeezed together, and there are other areas comprising each less than the full length of corrugations 40 in which the convolutions are spread apart. Accordingly, for a given magnitude of movement of the actuator 20 either upwardly or downwardly, in areas where the convolutions are squeezed together there is a smaller distance between individual adjacent convolutions than would occur if the total compression were distributed over the entire length of corrugations 40, and likewise in areas where the convolutions are spread apart there is a wider spread between adjacent convolutions than would occur if the total spread were distributed over the entire length of corrugations. Therefore, the reverse curvature of axis 42, which is produced by movement of actuator 20 either upwardly or downwardly, causes a more violent kneading of the walls of conduit 33 than would be produced by uni-direction curvature of the axis 42, and the reverse curvature of axis 42 is an incident to the rigidity of the connections between the several opposite ends of conduit 33 and the housing 11 and actuator end 25 respectively, the attachments 34 and 35 being rigid accordingly.

When the actuator 20 is moved upwardly to its position of Fig. 2, convolutions are compressed together along the uppermost surface of the wall of conduit 33 between points opposite points 43 and 44 along axis 42, and also along the lowermost surface of the wall between points opposite points 44 and 45 along the axis 42, convolutions being spread apart between the points opposite points 43 and 45 on axis 42, along the lowermost surface and between points opposite points 44 and 45 on axis 42 along the uppermost surface. Conditions are reversed when actuator 20 is moved downwardly to its position of Fig. 3, convolutions being spread along the uppermost surfaces of the conduit wall between points opposite points 43 and 44 on axis 42 and along the lowermost surface between points opposite points 44 and 45 on axis 42, convolutions also being compressed along the lowermost surface between the points opposite points 43 and 44 and along the uppermost surface between the points opposite points 44 and 45.

Thus, by movement of actuator 20 upwardly from either position of Fig. 1 or Fig. 3 to the position of Fig. 2, corrugations 40 in predetermined areas of the wall surface of conduit 33 are spread and in other predetermined areas the corrugations are constricted, and the several spread and constricted areas are respectively constricted and spread by movement of actuator 20 in the opposite downward direction to the position of Fig. 3 from either position of Figs. 1 or 2. Sections of the wall are distorted oppositely by the actuating arm 20 being moved alternately in the opposite directions with the result that spaces between adjacent convolutions are alternately contracted and expanded and the spaces are changed correspondingly volumetrically.

The volumetric magnitudes of spaces between convolutions of corrugations 40 are diminutive, inherently so as a result of the corrugated structure, and the volumetric changes of spaces between adjacent convolutions therefore are proportionately high. The proportion of volumetric changes of the spaces between adjacent convolutions by movement of actuator 20 to either position of Figs. 2 and 3 is greatly magnified by the reverse curvature of axis 42 that results from the attachments 34 and 35 being rigid. Thus, any masses of ice that accumulate between adjacent convolutions is subjected to crushing stresses that are comparatively high, the crushing stresses in any event being high enough to overcome any capacity of the ice to resist crushing action of which volume is a factor. Ice masses that accumulate on the wall surface of conduit 33 are therefore squeezed and thrown away from the conduit 33.

The actuator 20 of the disclosed embodiment being a lever, the length of the lever arm is a factor. The distance between the fulcrum 26, 27 and the attachment 35 is much greater than the length of corrugations 40, and relative thereto approaches infinity. This makes the reverse curvature of axis 42 much sharper. This positions the axis 42 to the right of point 45 in Figs. 2 and 3 almost parallel with the axis 42 to the left of point 43.

The conduit 33 comprises the rigid length 47 that is cylindrical, and which is disposed between the length of convolutions 40 and the attachment 34. The length of convolutions 40 is reduced accordingly, and to an extent that makes the reverse curvature of axis 42 sufficiently sharp when the actuator 20 is moved to operate the switch 12 that any ice accumulation on conduit 33 is certainly crushed and thrown off by movement of actuator 20. The rigid cylindrical position 47 of conduit 33 extenuates the kneading action of the conduit walls by movement of the conduit with the actuator 20.

The conduit 33 is fluid tight, as also the attachments 34 and 35, and therefore the housing 11 including the conduit 33 constitutes a weatherproof container for the mechanism 12.

The drawing presents one practical embodiment of the invention, the scope of which is not limited to the specific structure that is shown.

I claim:

1. In the combination of a mechanism contained in a housing and comprising an actuator for the mechanism operable at a position exteriorly of the housing, the actuator comprising a lever extending to the exterior of the housing from the mechanism interiorly thereof, the housing comprising an aperture in a wall thereof through which the actuator projects from the interior to the exterior of the housing, the housing comprising a fulcrum for the lever in the wall opposite the wall of the aperture and beyond the mechanism with reference to the aperture, a conduit around the actuator and projecting from the aperture exteriorly of the housing, the conduit comprising corrugated walls of rigid material, the corrugations extending transversely of the length of actuator, a rigid attachment between the conduit at its one end and the actuator, a rigid attachment at the aperture between the housing and the conduit at its other end, the conduit constituting a fluid-tight container, and the attachments of the conduit to the housing being around the aperture and fluid-tight, and the attachment of the conduit to the actuator being around the actuator and sealed fluid-tight to enclose the actuator weatherproof.

2. In the combination as defined in claim 1, the mechanism constituting an electrical switch embodying a push button bearing against the lever for operation thereby.

References Cited in the file of this patent
UNITED STATES PATENTS

| | | |
|---|---|---|
| 1,957,825 | Flagg | May 8, 1934 |
| 1,976,966 | Royle | Oct. 16, 1934 |
| 2,419,180 | Unger | Apr. 15, 1947 |
| 2,527,475 | Bates | Oct. 24, 1950 |